United States Patent [19]

Schündehütte et al.

[11] Patent Number: 5,587,465
[45] Date of Patent: Dec. 24, 1996

[54] 5-CHLORO-4-FLUOROPYRIMIDINYL SUBSTITUTED DIAZOPYRIDONE

[75] Inventors: Karl-Heinz Schündehütte, Leverkusen; Karl J. Herd, Odenthal, both of Germany

[73] Assignee: Bayer Aktiengesellschaft, Leverkusen, Germany

[21] Appl. No.: 460,702

[22] Filed: Jan. 4, 1990

[30] Foreign Application Priority Data

Jan. 10, 1989 [DE] Germany .................. 39 00 535.6

[51] Int. Cl.$^6$ .................. C09B 62/245; C09B 62/25; D06P 1/382
[52] U.S. Cl. .................. 534/635; 534/606; 8/549
[58] Field of Search .................. 534/606, 635, 534/637, 638, 641

[56] References Cited

U.S. PATENT DOCUMENTS

| | | | |
|---|---|---|---|
| 4,039,523 | 8/1977 | Hegar | 534/635 |
| 4,067,864 | 1/1978 | Oesterlein et al. | 534/635 |
| 4,283,331 | 8/1981 | Seitz et al. | 534/635 X |
| 4,299,764 | 11/1981 | Jager, I | 534/635 |
| 4,560,388 | 12/1985 | Rohrer | 534/638 X |

FOREIGN PATENT DOCUMENTS

| | | |
|---|---|---|
| 2148445 | 3/1973 | France . |
| 2903021 | 7/1980 | Germany .................. 534/635 |

*Primary Examiner*—Fiona T. Powers
*Attorney, Agent, or Firm*—Sprung Horn Kramer & Woods

[57] ABSTRACT

Dyestuffs of the formula

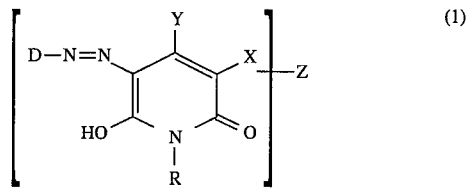

wherein

D represents the radical of a diazo component;

R represents hydrogen, an optionally substituted alkyl radical, a cycloaliphatic hydrocarbon radical, an optionally substituted phenyl radical, or a hetaryl radical;

represents H, Cl, Br, $CH_3$, $CH_2SO_3H$, $CH(CH_3)$—$SO_3H$, $CONH_2$, CN, $COCH_3$, $SO_3H$,

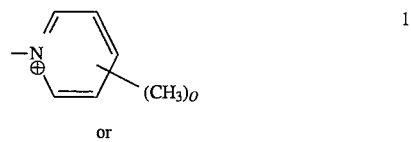

or

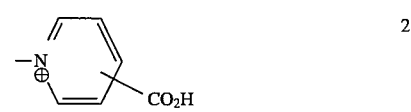

Y represents hydrogen, hydroxyl, an optionally substituted alkyl radical, an optionally substituted phenyl or benzyl radical, or carboxyl; and Z represents a fiber-reactive radical of the formula

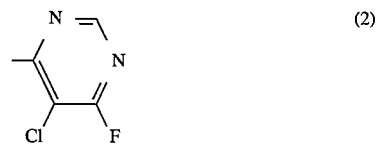

are suitable for dyeing fiber materials containing OH and amide groups and produce dyeings and prints with good fastness properties.

2 Claims, No Drawings

5-CHLORO-4-FLUOROPYRIMIDINYL SUBSTITUTED DIAZOPYRIDONE

The present invention relates to mono reactive mono and disazo reactive dyestuffs of the formula

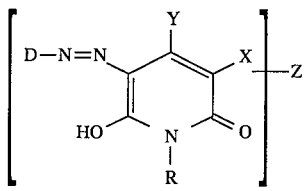

wherein

D=the radical of a diazo component,

R=H, a $C_1$–$C_6$-alkyl radical which is optionally substituted by OH, $SO_3H$, $OSO_3H$, $NH_2$, $CO_2H$, $NH(C_1$–$C_4$-alkyl) or $C_1$–$C_4$-alkoxy, a cycloaliphatic $C_3$–$C_6$-hydrocarbon radical, a phenyl which is optionally substituted by $SO_3H$, $CO_2H$, $CH_3$, Cl, Br, $OCH_3$, $OC_2H_5$, $NH_2$ or $NH(C_1$–$C_4$-alkyl) or hetaryl radical, X=H, Cl, Br, $CH_3$, $CH_2SO_3H$, $CH(CH_3)$—$SO_3H$, $CONH_2$, CN,

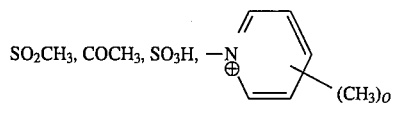

or

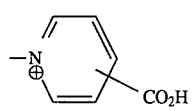

Y=H, OH or a $C_1$–$C_4$-alkyl radical which is optionally substituted by Cl, OH, $SO_3H$, $OSO_3H$ or $CO_2H$; or a phenyl or benzyl radical which is optionally substituted by $SO_3H$, $CO_2H$, $CH_3$, Cl, Br, $OCH_3$, $OC_2H_5$, $NH_2$ or $NH(C_1$–$C_4$-alkyl), or $CO_2H$ and represents the fibre-reactive radical of the formula (2)

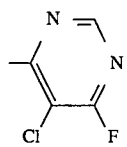

D preferably represents a radical of the benzene, naphthalene or azobenzene series which contains sulpho groups, and can additionally be substituted by further substituents, for example $SO_3H$, $CO_2H$, $C_1$–$C_4$-alkyl, halogen, $C_1$–$C_4$-alkoxy, acylamino, ureido, mesylamino, amino, $C_1$–$C_4$-alkylamino, amino-$C_1$–$C_4$-alkyl, $C_1$–$C_4$-alkylamino-$C_1$–$C_4$-alkyl, specifically aminomethyl or (methylamino)methyl, or 2-aminoethylsulphonyl or 2-(N-alkylamino)ethylsulphonyl.

Z can be bonded both to D and to Y or R.

Monoreactive azo-reactive dyestuffs which are to be singled out are those of the formulae

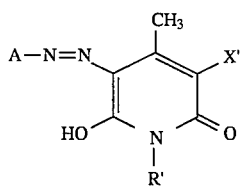

and

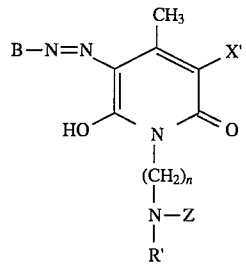

wherein A =

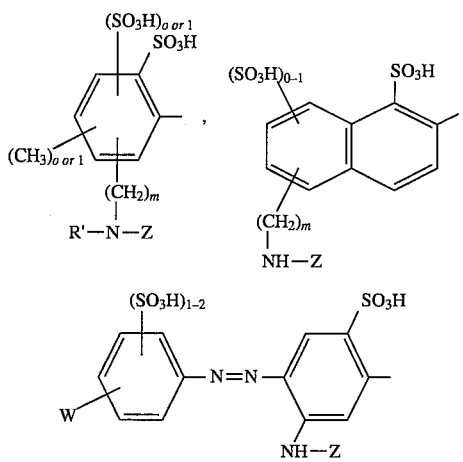

B =

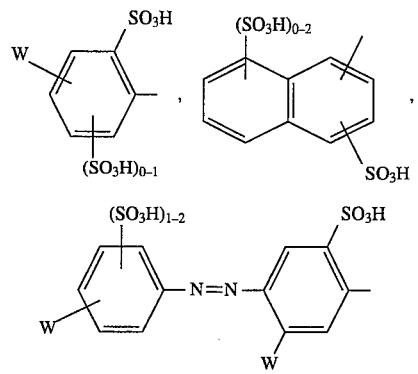

wherein n=2, 3 or 4, m=0 or 1,

R'=H, $CH_3$, $C_2H_5$, $C_3H_7$, $C_4H_9$, $CH_2CH_2OH$, $CH_2CH_2SO_3H$, $CH_2CH_2OSO_3H$ or $CH_2CH_2CH_2$—$OCH_3$,

X'=H, $SO_3H$, $CONH_2$ or $CH_2SO_3H$ and

W=H, $CH_3$, $OCH_3$, $OC_2H_5$, Cl, Br, $NHCOCH_3$ or $NHCONH_2$.

Particularly preferred monoazo reactive dyestuffs are those of the formula

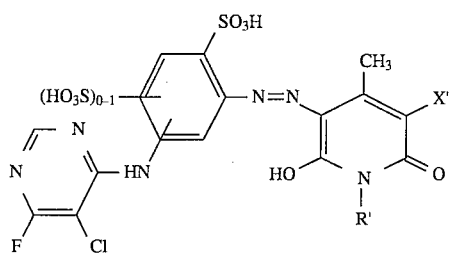

(5)

wherein X' and R' have the abovementioned meaning.

The azo dyestuffs according to the invention can exist in several tautomeric forms. For simplicity, the dyestuffs are given in only one of these tautomeric forms.

The dyestuffs (2) are prepared by a process in which pyridone dyestuffs containing amino groups, of the formula

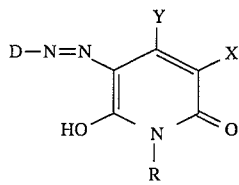

(6)

wherein D, Y, X and R have the abovementioned meaning and contain an acylatable amino group, are subjected to a condensation reaction with 4,6-difluoro-5-chloropyrimidine in the presence of acid-binding agents in the pH range of 3.5–9.5, or an amino compound $D-NH_2$ substituted by Z (=5-chloro-6-fluoro-4-pyrimidinyl radical), for example $A-NH_2$, is diazotized and the diazotization product is coupled in a known manner to a pyridone derivative which contains no radical Z, or an amino compound $D-NH_2$ which contains no radical Z, such as, for example, $B-NH_2$, is diazotized and the diazotization product is coupled in a known manner to a pyridone derivative substituted by Z.

Amino compounds $A-NH_2$, for example those of the formula (7, Q=Z) or (8, Q=Z) are obtained by a process in which diamino compounds of the formula (7, Q=H) or (8, Q=H) are subjected to a condensation reaction with 4,6-difluoro-5-chloropyrimidine in the presence of acid-binding agents:

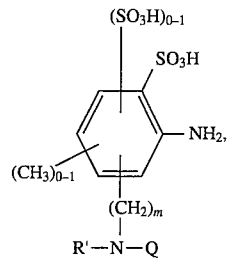

(7)

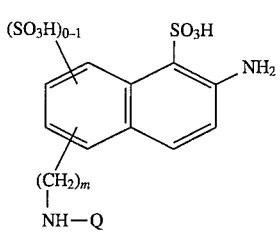

(8)

Amino compounds $A-NH_2$ containing azo groups, such as

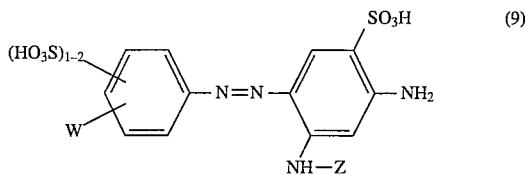

(9)

are obtained by diazotization of aniline derivatives of the formula (10) and coupling of the diazonium compounds to a compound of the formula (11).

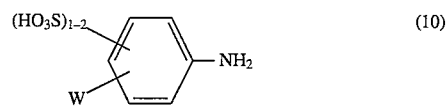

(10)

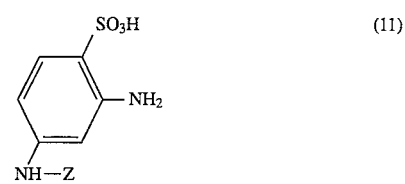

(11)

Amino compounds of the formula $B-NH_2$, like pyridone derivatives which are free from radicals Z, are known from the literature. Z-substituted pyridone derivatives are prepared by condensation of 4,6-difluoro-5-chloropyrimidine with pyridones which have a primary or secondary amine function on one of the substituents.

The monoazo reactive dyestuffs of the formula (5) are prepared either by condensation of aminoazo dyestuffs of the formula

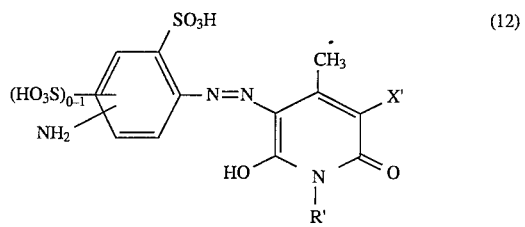

(12)

with 4,6-difluoro-5-chloropyrimidine in the presence of acid-binding agents, such as sodium carbonate or bicarbonate, or by diazotization of amino compounds of the formula (13)

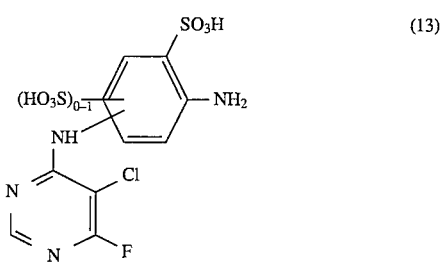

(13)

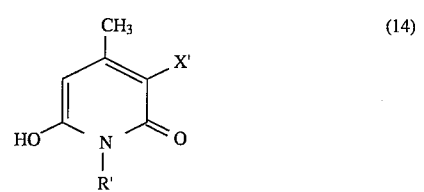

(14)

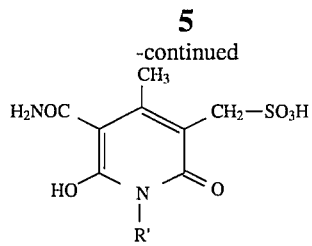

(15)

and coupling of the diazonium compounds to pyridones of the formula (14) or (15), such as is described, for example, in DE-A 2,162,612.

Compounds (13) are accessible, for example, by condensation of 2,4-diaminobenzenesulphonic acid or 2,4-diamino-1,5-benzenedisulphonic acid with 4,6-difluoro-5-chloropyrimidine at temperatures of 20° to 50° C. and pH values of 4.5 to 10.0.

The new monofunctional azopyridone dyestuffs containing the fibre-reactive 5-chloro-6-fluoro-4-pyrimidinyl radical are suitable for dyeing and printing materials containing hydroxyl or amide groups, such as textile fibres, threads and woven fabrics of wool, silk and synthetic polyamide and polyurethane fibres, and for wash-fast dyeing and printing of naturally occurring or regenerated cellulose, the treatment of cellulose materials advantageously being carried out in the presence of acid-binding agents and if appropriate by the action of heat in accordance with the processes customary for reactive dyestuffs.

The formulae given for the dyestuffs are those of the corresponding free acids. The dyestuffs are in general isolated in the form of the alkali metal salts, for example the lithium-, sodium- or potassium salts, and are employed as such for dyeing and printing.

The dyestuffs can be employed in dyeing either as powders or as a concentrated aqueous dyestuff solution.

EXAMPLE 1

27.3 g of 2,4-diaminobenzenesulphonic acid are suspended in 150 ml of water and dissolved with dilute sodium hydroxide solution at pH 6.5. 1 g of sodium dihydrogen phosphate and 1 g of disodium hydrogen phosphate are added as buffer substances and the mixture is heated to 35 ° C. 23.2 g of 5-chloro-4,6-difluoropyrimidine are metered in over a period of one hour, and during this procedure and in the after-reaction phase the pH is kept constant at between 6.2 and 6.5 with sodium carbonate solution. The temperature rises to 40 ° C. during the acylation and falls again to 35° C. after an after-stirring time of one hour.

200 g of ice and 40 ml of 25% strength hydrochloric acid are added to the acylation mixture and 35 ml of a sodium nitrite solution (300 g/l) are then added dropwise in the course of 15 minutes. The reaction temperature is kept below 5° C. by occasional addition of ice. The diazotization has ended after about 30 minutes. The diazo compound has precipitated in a pale yellow crystalline form. The excess nitrite is removed with amidosulphonic acid solution.

41.2 g of the sodium salt of 1,4-dimethyl-3-aminocarbonyl-5-sulphomethyl-6-hydroxy-2-pyridone are dissolved in 250 ml of water at pH 7 and this solution is metered into the above diazonium salt suspension. The pH value is kept at 6.5 by dropwise addition of sodium carbonate solution. After 30 minutes, the coupling has ended. A clear yellow solution results. The dyestuff is salted out by addition of 90 g of sodium chloride and isolated at 40° C. by filtration with suction. Drying at 50° C. in vacuo gives 135 g of a salt-containing yellow dyestuff powder which dyes cotton, by the dyeing process practised for reactive dyestuffs, in a brilliant greenish-tinged yellow colour shade ($\lambda_{max}$=420nm in $H_2O$).

The dyestuff has the structure

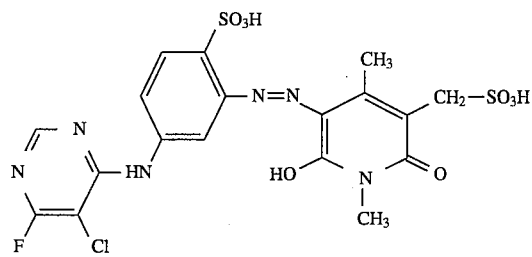

EXAMPLE 2 TO 7

Similarly useful reactive dyestuffs having a comparable shade are obtained if, instead of 1,1-dimethyl-3-aminocarbonyl-5-sulphomethyl-6-hydroxy-2-pyridone in Example 1, the coupling component now employed is 1-ethyl-4-methyl-3-aminocarbonyl-5-sulphomethyl-6-hydroxy-2-pyridone (Example 2, $\lambda_{max}$=420 nm), 1-n-butyl-4-methyl-3-aminocarbonyl-5-sulphomethyl-6-hydroxy-2-pyridone (Example 3, $\lambda_{max}$=422 nm), 1,4-dimethyl-3-sulpho-6-hydroxy-2-pyridone (Example 4, $\lambda_{max}$=421 nm), 1-(2-sulphoethyl)-4-methyl-3-aminocarbonyl-6-hydroxy-2-pyridone (Example 5), 1-(2'-sulphatoethyl)-4-methyl-6-hydroxy-2-pyridone (Example 6) or 4-carboxy-6-hydroxy-2-pyridone (=citrazinic acid) (Example 7).

EXAMPLE 8

Completely analogously to the 2,4-diaminobenzenesulphonic acid in Example 1, 38.9 g of 2,5-diamino-1,4-benzenedisulphonic acid are subjected to a condensation reaction with 23.2 g of 5-chloro-4,6-difluoropyrimidine at 40° C., the condensation product is diazotized and the diazotization product is coupled to 18.1 g of 1,4-dimethyl-6-hydroxy-2-pyridone analogously to Example 1. A dyestuff of the structure

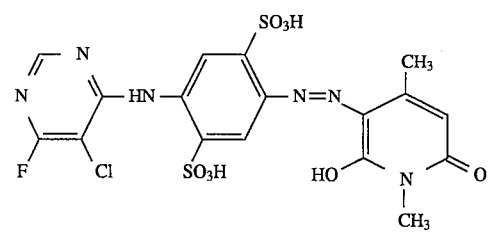

which dyes cotton in a yellow colour shade, is isolated.

EXAMPLE 9

If 2,4-diamino-1,5-benzenedisulphonic acid, 5-chloro-4,6-difluoropyrimidine and 1,4-dimethyl-3-aminocarbonyl-6-hydroxy-2-pyridone are employed in appropriate proportions and the three reaction steps are carried out analogously to Example 1 or 8, a dyestuff of the structure is obtained.

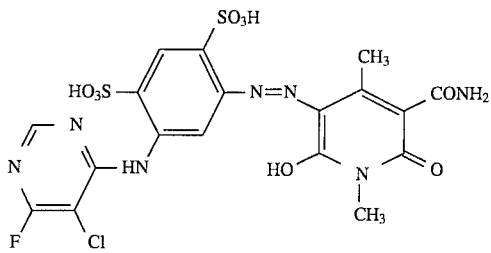

EXAMPLE 10

36.5 g of 5-aminomethyl-2-amino-1-naphthalenesulphonic acid are stirred into 300 ml of water, 100 g of ice and 80 ml of 25% strength hydrochloric acid and the mixture is diazotized with 35 ml of a 30% strength sodium nitrite solution. After removal of the excess nitrite, the resulting solution of the diazonium salt is metered into a solution of 41.2 g of 1,4-dimethyl-3-aminocarbonyl-5-sulphomethyl-6-hydroxy-2-pyridone (Na salt) in 250 ml of water. During this procedure, the pH value is kept constant at between 6.5 and 7.5 by dropwise addition of sodium carbonate solution. The coupling reaction has ended after 30 minutes.

The mixture is then heated to 35° C. and 23.2 g of 5-chloro-4,6-difluoropyrimidine are added in portions. At the same time, sodium carbonate solution is metered in at such a rate that the pH value is in the range from 7.5 to 8.5. The dyestuff slowly crystallizes out. After an after-stirring time of one hour, 40 g of sodium chloride are added, the mixture is stirred for 30 minutes and the dyestuff is isolated. The dry dyestuff powder, which is attributed the structure

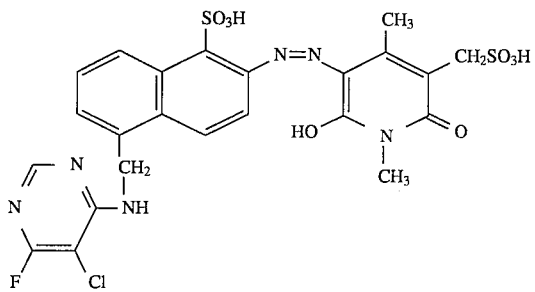

produces a clear greenish-tinged yellow dyeing on cotton ($\lambda_{max}$=432 nm).

EXAMPLE 11

If equimolar amounts of 2-amino-4-(N-methylaminomethyl)-benzenesulphonic acid are now employed instead of 5-aminomethyl-2-amino-1-naphthalenesulphonic acid in Example 10 and the reaction is carried out analogously to Example 10, a dyestuff of the structure

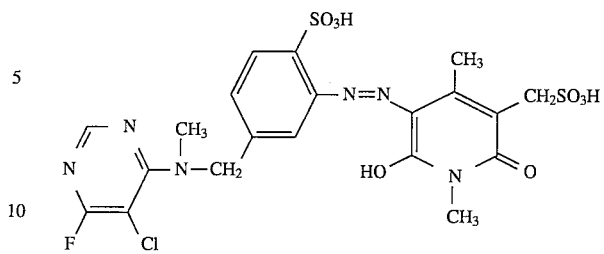

which produces brilliant greenish-tinged yellow dyeings on cotton, is obtained.

EXAMPLE 12

130 g of the salt-containing pyridone dyestuff of the structure

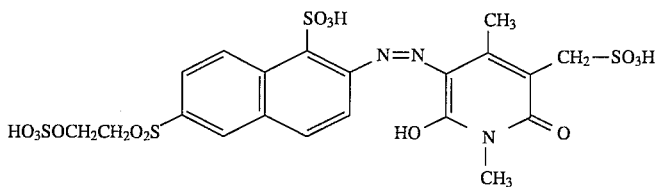

described in European Application EP 281,892 (Example 1), are dissolved in 400 ml of water, and a solution of 60 g of sodium (2-aminoethyl)-sulphonate in 200 ml of water is added. The mixture is heated to 40° C. and stirred at 40° C. for one hour. The pH is then brought to 6.0 with hydrochloric acid and 140 g of sodiumchloride are added. The dyestuff which has precipitated out is filtered off with suction and the moist dyestuff paste isolated is stirred into 400 ml of water. The pH value is corrected to 8.0 and the solution is heated to 35° C. 25.0 g of 5-chloro-4,6-difluoropyrimidine are now added in portions, and during this procedure, and in the after-reaction phase, the pH value is kept constant at between 7.5 and 8.5 with sodium carbonate solution.

After about 1 hour, the condensation reaction has ended. The mixture is cooled to 20° C. and the product is salted out with 50 g of sodium chloride and 50 g of potassium chloride. The dyestuff is filtered off with suction and dried. It dyes cotton in a greenish-tinged yellow colour shade and has the structure

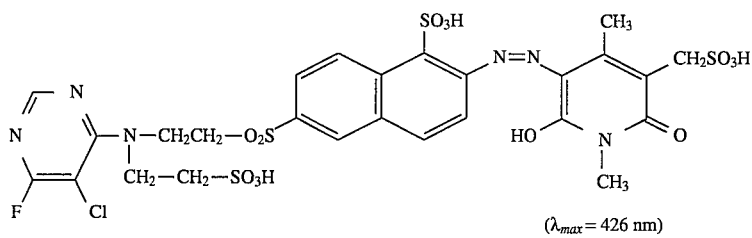

($\lambda_{max}$ = 426 nm)

EXAMPLE 13

A diazonium salt mixture which has been prepared by diazotization of 25.1 g of 3-aminobenzenesulphonic acid is metered into a neutral mixture of 50.0 g of the condensation product of 2,4-diaminobenzenesulphonic acid (Na salt) and 5-chloro-4,6-difluoropyrimidine (see Example 1) in 250 ml of water. During this addition, the pH value is kept at 6.0 to 6.5 by continuous addition of solid sodium bicarbonate. After a reaction time of six hours, the dyestuff of the structure

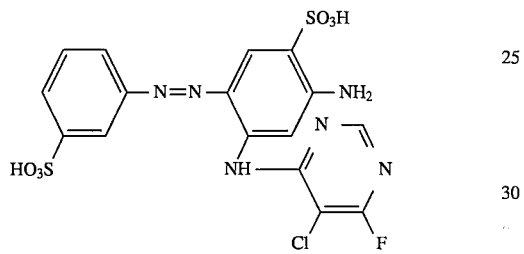

is isolated by salting out with sodium chloride and filtration with suction. The moist paste of the intermediate product is suspended in 200 ml of water and 200 g of ice and the pH is brought to 2.3 to 2.5 at 0° C. with hydrochloric acid. Diazotization is carried out slowly with 35 ml of a sodium nitrite solution (300 g/l), both the temperature being kept constant at 0° C. and the pH being kept constant at 2.3 to 2.5. The mixture is subsequently stirred for one hour, the excess nitrite is removed and the diazotization mixture is added to a solution of 41.2 g of 1,4-dimethyl-3-aminocarbonyl-5-sulphomethyl-6-hydroxy-2-pyridone (Na salt) in 250 ml of water in the course of 30 minutes. The pH value is kept at 6.5 to 7.5 by dropwise addition of sodium carbonate solution. After addition of the diazotization, the mixture is subsequently stirred for 15 minutes and the dyestuff is isolated by salting out (100 g of potassium chloride) and filtration with suction. After drying at 60° C., 145 g of a salt-containing red dyestuff powder which is attributed the following structure:

The new disazopyridone dyestuff dyes cotton in brilliant orange colour shades.

If the first diazo component and the pyridone derivative in Example 13 are varied and the procedure during the reactions is as in Example 13, the following reactive dyestuffs, which are likewise useful, are obtained.

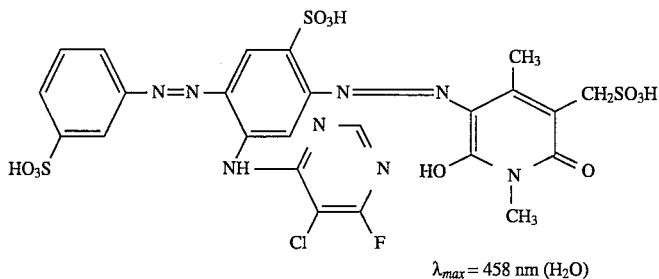

$\lambda_{max}$ = 458 nm (H$_2$O)

result.

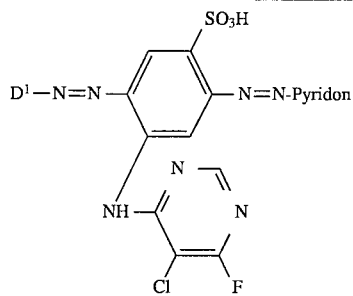

| Example | D¹ | Pyridone | Colour shade |
|---|---|---|---|
| 14 | 4-HO₃S-C₆H₄- | 1-ethyl-6-hydroxy-4-methyl-5-methyl-3-(CH₂SO₃H)-pyridone | orange (462 nm) |
| 15 | 2,5-disulfophenyl (2-SO₃H, 5-HO₃S) | 1-methyl-6-hydroxy-4-methyl-5-methyl-3-CONH₂-pyridone | scarlet |
| 16 | 2,4-disulfophenyl | 1-methyl-6-hydroxy-4,5-dimethyl-pyridone | orange |
| 17 | 4-HO₃S-C₆H₄- | 1-(CH₂CH₂SO₃H)-6-hydroxy-4,5-dimethyl-pyridone | orange (460 nm) |
| 18 | 2-SO₃H-5-CH₃-phenyl | 1-methyl-6-hydroxy-4-methyl-5-methyl-3-(CH₂SO₃H)-pyridone | orange (457 nm) |
| 19 | 2-SO₃H-5-CH₃O-phenyl | 1-methyl-6-hydroxy-4-methyl-5-methyl-3-(CH₂SO₃H)-pyridone | red |

-continued

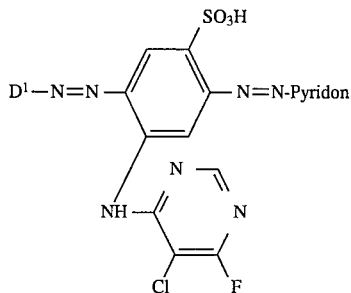

| Example | D¹ | Pyridone | Colour shade |
|---|---|---|---|
| 20 | HO₃S–⟨benzene⟩– | ⟨4-CO₂H-6-OH-2-pyridone⟩ | orange |

EXAMPLE 21

28.6 g of 1-(2-aminoethyl)-3-aminocarbonyl-4-methyl-6-hydroxy-2-pyridone are dissolved in 250 ml of water under neutral conditions and the solution is heated to 35° C. 23.2 g of 5-chloro-4,6-difluoropyrimidine are added in portions at a constant pH of 8.0. The pH value is controlled by addition of sodium carbonate solution. The mixture is subsequently stirred at 35° C. for 30 minutes, the condensation product of the structure

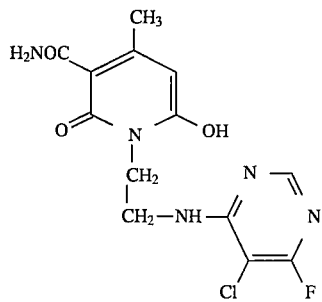

partly crystallizing out. The mixture is heated to 60° C. and 55 ml of a neutral 37% strength hydroxymethanesulphonic acid solution are then added at pH 7. The mixture is heated at 60° C. for a further hour at a constant pH of 7, a clear reaction solution resulting. The solution of the new intermediate product of the structure

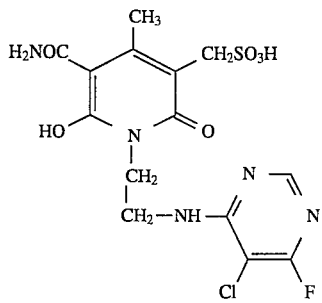

is cooled to room temperature and reacted with a diazonium salt mixture which has been prepared by diazotization of 47.1 g of Na 2-amino-1,5-naphthalenedisulphonate. During the coupling, the pH value is kept constant at 6.5 to 7.5 with sodium carbonate solution. When the reaction has ended, the product is salted out with sodium chloride and the dyestuff which has precipitated out is filtered off with suction. After drying, about 150 g of a yellow dyestuff powder of the structure

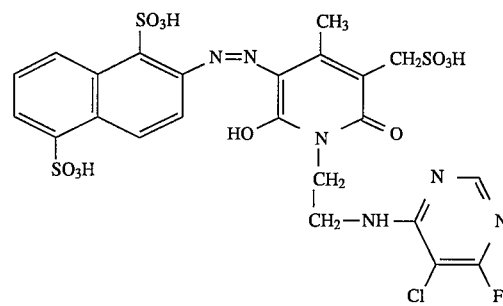

which dyes cotton in clear yellow shades with a high level of fastness, are obtained. $\lambda_{max}$=430 nm (H$_2$O)

Other useful reactive dyestuffs are accessible analogously to Example 21 by varying the diazo component and the pyridone substitution:

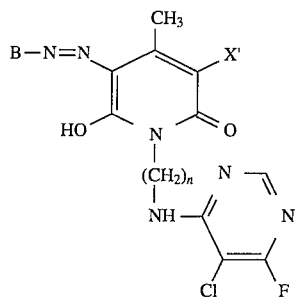

| Example | B | X' | n | Colour shade |
|---|---|---|---|---|
| 22 | 2-SO₃H-phenyl | CH₂SO₃H | 2 | greenish-tinged yellow (422 nm) |
| 23 | 2-(1-SO₃H-naphthyl) | CH₂SO₃H | 2 | yellow |
| 24 | 6-methyl-1,3,? naphthalene trisulfonic acid derivative (SO₃H, HO₃S, SO₃H) | CONH₂ | 2 | yellow |
| 25 | 6-methyl-1,3,? naphthalene trisulfonic acid derivative (SO₃H, HO₃S, SO₃H) | H | 2 | yellow |
| 26 | 2-(1,5-disulfo naphthyl) | CH₂SO₃H | 3 | yellow (430 nm) |
| 27 | 4-Cl-2-SO₃H-phenyl | CH₂SO₃H | 2 | greenish-tinged yellow |
| 28 | 2,5-disulfophenyl | H | 2 | greenish-tinged yellow |
| 29 | HO₃S-C₆H₄-N=N-C₆H₃(SO₃H)- | CH₂SO₃H | 2 | golden yellow (456 nm) |

-continued
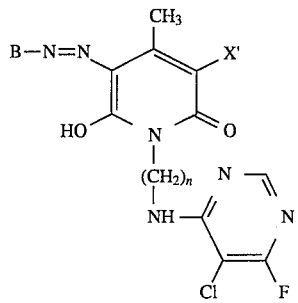
| Example | B | X' | n | Colour shade |
|---|---|---|---|---|
| 30 | 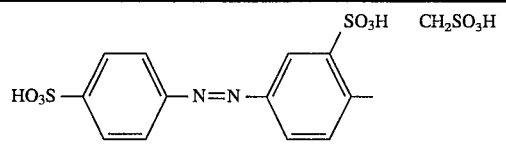 | $SO_3H$   $CH_2SO_3H$ | 3 | golden yellow (456 nm) |
We claim:
1. A dyestuff of the formula:
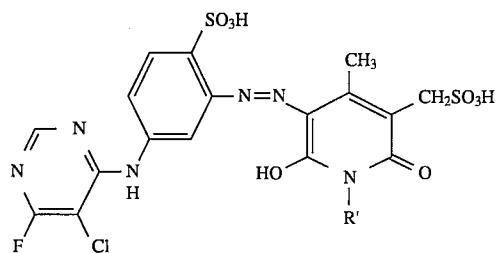
wherein
R'=H, $CH_3$, $C_2H_5$, $C_3H_7$ or $C_4H_9$.
2. A method of dyeing cotton fiber comprising contacting said fiber with a dyestuff according to claim 1.
* * * * *